C. L. SMITH AND E. S. WEBSTER.
RASPING DISK.
APPLICATION FILED AUG. 1, 1919.
1,347,298. Patented July 20, 1920.
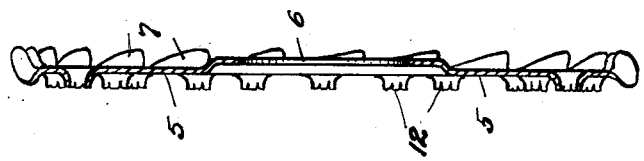
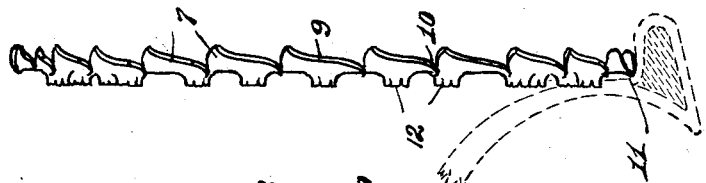
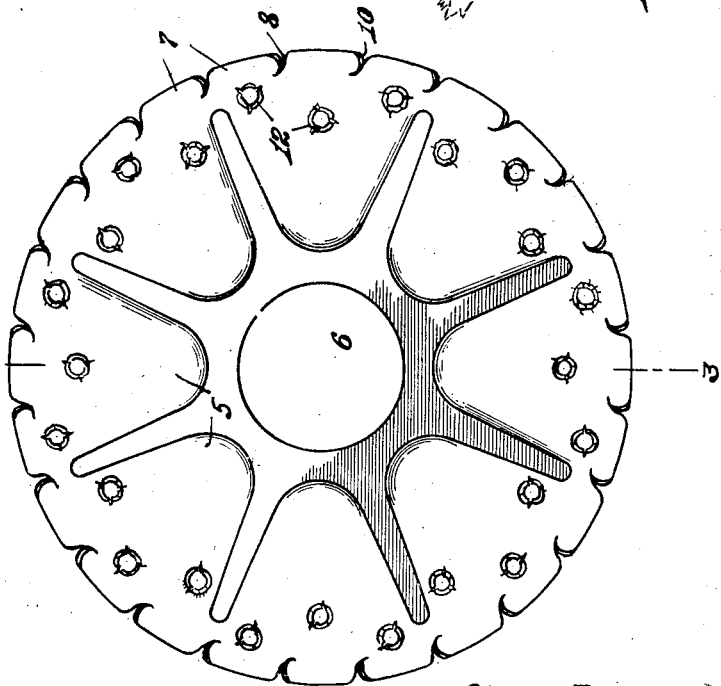
Clyde L. Smith
Emmett S. Webster
INVENTORS
By George J. Oltsch
ATTORNEY

UNITED STATES PATENT OFFICE.

CLYDE L. SMITH AND EMMETT S. WEBSTER, OF SOUTH BEND, INDIANA, ASSIGNORS, BY MESNE ASSIGNMENTS, TO SMITH ONE HEAT SYSTEM, OF SOUTH BEND, INDIANA, A CORPORATION OF INDIANA.

RASPING-DISK.

1,347,298.  Specification of Letters Patent.  Patented July 20, 1920.

Application filed August 1, 1919. Serial No. 314,677.

*To all whom it may concern:*

Be it known that we, CLYDE L. SMITH and EMMETT S. WEBSTER, citizens of the United States, residing at South Bend, in the county of St. Joseph and State of Indiana, have invented certain new and useful Improvements in Rasping-Disks, of which the following is a specification.

The invention relates to rasping disks, and more particularly to a device of that nature particularly adapted for rasping away the outer rubber layer or stock of tire casings or shoes at the angle formed by the beads and side portions of the tire.

The object of the invention resides in the provision of a highly efficient rasping disk for the purpose stated, which has both an edgewise and sidewise rasping surface, whereby the rubber stock of both the upper bead surface and adjacent side wall of a tire may be operated upon simultaneously.

Rubber tires or casings are being extensively retreaded when worn, as well as new tires having defective tread portions, which operation requires the removal of the old tread stock. Such removal, owing to the tenacious adherence of the rubber stock to the tire carcass, as well as the elastic nature of the rubber, renders it quite difficult to readily and quickly remove the same by ordinary methods and tools, thus involving considerable expense incident thereto. It is for the purpose of greatly facilitating such removal and incidentally reducing the expense thereof to which the present improvement is directed.

The invention in the preferred form of details will be described in the following specification, reference being had particularly to the accompanying drawings, in which:—

Figure 1 is a side elevation of the improved disk.

Fig. 2 is an edge view thereof, the cross-sectional part of a tire being shown in dotted lines to illustrate the particular use of the disk.

Fig. 3 is a cross-section of the disk taken on the line 3—3 of Fig. 1.

Referring now more particularly to the drawings, the disk is preferably of suitable sheet metal stamped to form by the use of dies, same being formed to have a series of radially directed raised portions or broad faced ribs 5, whereby to give rigidity to and prevent the easy flexing of the disk. A central circular aperture 6 is provided to receive an arbor or shaft for mounting and driving the same at high speed.

The edge of the disk is provided with a series of regularly spaced teeth 7, which are formed by slitting the marginal edge thereof, as at 8, and thence bending the ends of each segmental portion so formed in opposite directions with respect to the plane of the disk. As thus formed the edges 9 of the segments are disposed diagonally with respect to the plane of the disk, thus providing a relatively broad rasping edge. The forward ends 10 of the teeth are sharpened to provide a cutting edge, and being rounded as well as disposed diagonally of the disk plane, the same conform more or less with the rounded corner formed at the meeting point of the bead and side wall of the tire, as at 11 in Fig. 2. Formed on one side of the disk and along the marginal edge thereof, are a series of circularly arranged studs 12, which are preferably formed by punching holes through the disk with a suitable instrument in a manner to tear the metal and produce jagged edges for the studs. These jagged edges are adapted, under rapid rotation of the disk, to tear and shred the rubber stock of the side wall of the tire adjoining the bead thereof, and to wear away and strip the rubber at the same time the upper bead surface is being similarly stripped. It is not intended that any of the rasping elements have keen cutting edges, the jagged or uneven edges being mainly relied upon to rip, strip and wear away the rubber from the carcass by the high speed of the disk, thus minimizing the danger of cutting through the fabric portion of the tire.

While the foregoing is the preferred form of the invention, it is to be understood that we do not limit ourselves to the precise structure shown and described, as it is obvious that the same may be variously modified without departing from the spirit of the invention.

What is claimed is:—

1. A circular rasping disk comprising a series of laterally projecting jagged-edged studs, and a series of edge teeth angularly disposed with relation to the plane of the disk.

2. A circular disk having a series of edge teeth disposed oblique with relation to the plane of the disk, and a series of jagged-edged studs extending laterally of and arranged adjacent the edge teeth.

3. A circular sheet metal disk having a series of edge teeth formed by slitting the marginal edge of the disk and bending the ends of the segmental portions so formed in opposite direction, whereby the edges of the teeth so formed will be disposed oblique with relation to the plane of the disk, and a series of laterally projecting jagged-edged studs arranged adjacent the edge teeth.

In testimony whereof we affix our signatures.

CLYDE L. SMITH.
EMMETT S. WEBSTER.